(12) United States Patent
Veldman et al.

(10) Patent No.: US 7,479,086 B2
(45) Date of Patent: Jan. 20, 2009

(54) STRUCTURE OF DIFFERENTIAL HOUSING

(75) Inventors: Robert Veldman, Brighton, MI (US); Zhipeng Han, Canton, MI (US)

(73) Assignee: Metaldyne Company, Plymouth, MI (US)

( * ) Notice: Subject to any disclaimer, the term of this patent is extended or adjusted under 35 U.S.C. 154(b) by 0 days.

(21) Appl. No.: 11/726,685

(22) Filed: Mar. 22, 2007

(65) Prior Publication Data
US 2007/0225103 A1 Sep. 27, 2007

Related U.S. Application Data

(60) Provisional application No. 60/784,844, filed on Mar. 22, 2006.

(51) Int. Cl.
*F16H 48/06* (2006.01)
(52) U.S. Cl. ...................................... 475/230
(58) Field of Classification Search .................. 475/230
See application file for complete search history.

(56) References Cited

U.S. PATENT DOCUMENTS

| 4,901,599 | A | 2/1990 | Irwin |
| 4,959,043 | A * | 9/1990 | Klotz et al. ................. 475/230 |
| 5,718,653 | A * | 2/1998 | Showalter ................... 475/230 |
| 6,045,479 | A | 4/2000 | Victoria et al. |
| 6,061,907 | A | 5/2000 | Victoria et al. |
| 6,896,637 | B2 * | 5/2005 | Krude et al. ................ 475/222 |
| 6,945,898 | B2 | 9/2005 | Szuba |
| 2004/0116235 | A1 | 6/2004 | Szuba |

OTHER PUBLICATIONS

WO Int'l Search Report, May 30, 2008, Metaldyne Company, LLC.

* cited by examiner

*Primary Examiner*—Dirk Wright
(74) *Attorney, Agent, or Firm*—Robert H. Earp, III; McDonald Hopkins LLC

(57) ABSTRACT

The present invention provides a differential housing having guide slots formed therein. The guide slots permit movement of pinion shaft axially therethrough. A plurality of apertures are provided in the housing for properly positioning a pinion shaft within the housing. The apertures further provide fluid communication between the exterior and the interior of the housing to aid in adequately lubricating the components within the differential housing.

20 Claims, 4 Drawing Sheets

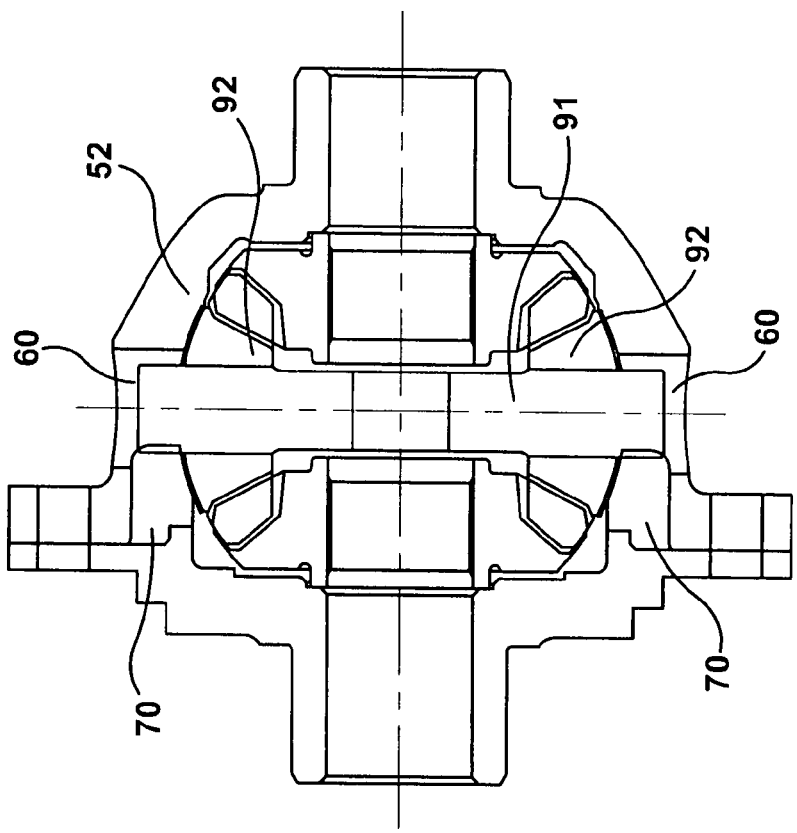
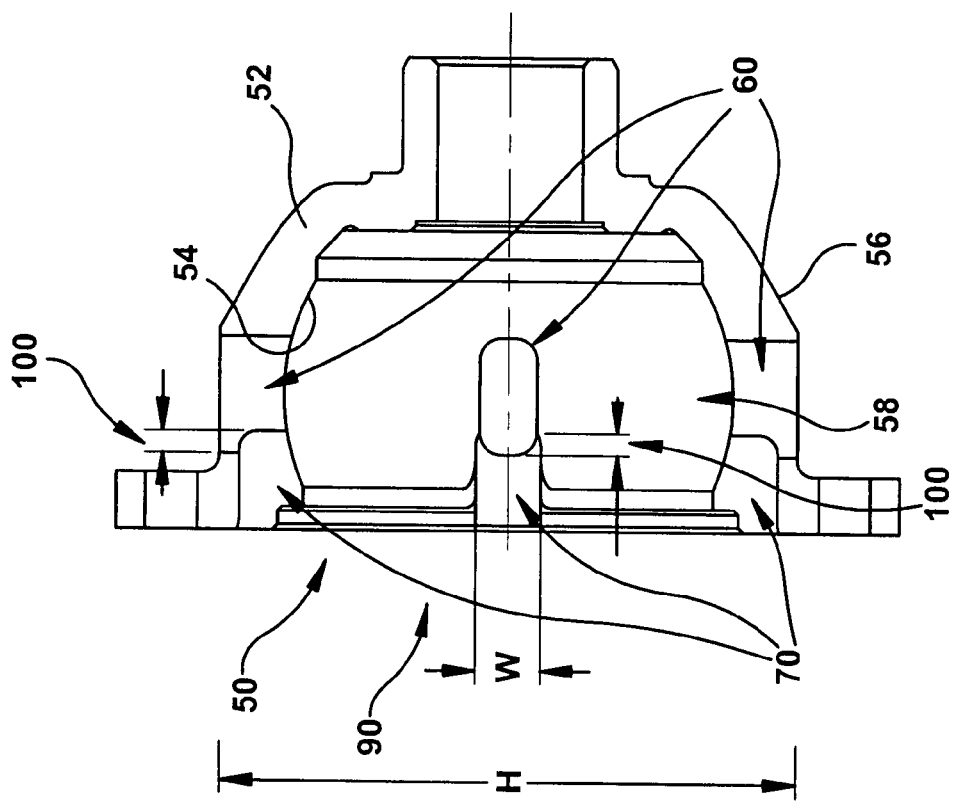

STRUCTURE OF DIFFERENTIAL HOUSING

CROSS-REFERENCE TO RELATED APPLICATIONS

This application claims priority from U.S. Provisional Patent Application No. 60/784,844 entitled "STRUCTURE OF DIFFERENTIAL HOUSING" filed on Mar. 22, 2006, which is hereby incorporated by reference in its entirety.

FIELD OF THE INVENTION

The present invention is generally related to mechanical differentials, and more particularly to an improved differential housing.

BACKGROUND

Differentials are known in the automotive industry as devices that split engine torque two ways, allowing each output to spin at a different speed. Generally, differentials have three primary tasks: to aim the engine power at the wheels; to act as the final gear reduction in the vehicle, slowing the rotational speed of the transmission one final time before transmission to the wheels; and to transmit the power to the wheels while allowing them to rotate at different speeds.

A typical mechanical differential contains a housing (or carrier), two side gears, and several pinion gears. A rotating driveshaft of the vehicle engages a ring gear, which is mounted onto the differential housing. The driveshaft drives the ring gear, which in turn rotates the differential housing. Pinion shafts attach the pinion gears to the housing so that, as the housing rotates, the pinion gears are driven. The pinion gears drive the two side gears, which in turn drive the axle (or half shafts) attached thereto.

The pinion shafts of the differential are supported by the differential housing so that the torque of the housing can be transmitted to the pinion shafts and thereby drive the pinion gears. The pinion gears spin upon the pinion shafts and rotate about the axis of the housing. A conventional differential housing utilizes either holes or slots in the wall of the differential housing to support the pinion shafts.

Pinion slots in the differential housing are shown in U.S. Pat. No. 6,743,138 issued to Visteon Global Technologies, Inc., hereby expressly incorporated by reference herein. As shown in FIGS. 3, 4, and 6, these slots assist in the assembly of the differential by permitting the axial loading of the pinion and gear set (e.g. spider-type pinion set). Specifically, FIG. 3 illustrates a differential housing 2 having slots 4 for axially loading a pinion shaft 6 having pinion gears 8. For example, the pinion gears 8 are secured to the pinion shaft 6 prior to axially inserting the pinion assembly into the housing 2. A cover 11 secures to the housing 2 to complete the assembly. FIG. 4 illustrates a spider pinion shaft 12 having four pinion gears 8 attached thereto. The spider pinion shaft 12 is axially inserted into the housing 2 by sliding within four slots 4 in the housing 2.

Another known differential assembly utilizes holes 20 in the differential housing 2 as shown in FIGS. 1, 2, and 5. The holes 20 permit a pinion shaft 22a to be inserted radially through the housing 2 from the exterior during assembly and supported therein during operation by locking pins mounted through the pinion shaft 22a and into the housing 2. The holes 20 support the pinion shaft 22a-22c such that the pinion gears 8 meshingly engage side gears 19. The pinion gears 8 may, for example, be positioned within the housing 2, and the pinion shaft 22a may be inserted from the outside of the housing 2 through each of the pinions gears 8.

Specifically, FIG. 2 illustrates four holes 20 in the housing 2 for insertion of the three pinion shafts 22a-22c. One of the pinion shafts 22a is capable of being inserted through one of the holes 20 from outside the housing 2. After insertion of the long pinion shaft 22a, the other pinion shafts 22b, 22c may be inserted through the holes in the housing 2. However, the hole-type design requires locking pins 25 for securing the shafts 22a-22c to the housing 2.

In addition, the hole-type design requires insertion of the pinion gears 8 into the housing 2 and feeding the shafts 22a-22c through the pinion gears 8. Therefore, with the hole-type feature, the pinion shafts 22 are separate parts that are inserted into the support holes 20 from the outside of the housing 2 during the assembly process requiring the coordination of numerous separate parts and assembly steps.

A spider pinion shaft 12 or a pinion shaft 6 having the pinion gears 8 attached thereto cannot be used with the differential housing 2 having the holes 20. The spider pinion shaft 12 requires the slots 4 for sliding the spider pinion shaft 12 into the housing 2. However, manufacturing the slot 4 is more expensive and requires special-purpose machines, like broach machines or coining machines, to process the slot 4 in an accurate circumferential position while maintaining an accurate width. Incorrect circumferential positioning of the pinion shafts 12 can cause extra damage load to the gear contact surfaces. Accurate slot width is necessary to ensure that the pinion shaft 12 can slide axially in the slots 4 without deflecting too far circumferentially. Too much circumferential deflection is detrimental to the contact surfaces of the pinion gears 8 and the pinion shaft 12.

Moreover, each of these known differential assemblies fails to provide adequate lubrication to the pinion gears 8 and the interior of the housing 2. In the hole-type embodiment, lubrication is limited from flowing through the housing 2 via the holes 20 due to the snug fit of the shafts 22a-22c in the holes 20. On the other hand, the slot-type design fails to provide any apertures in the housing for lubrication.

Accordingly, there is a need in the art for a differential housing capable of supporting axially loading pinion shafts, such as a spider pinion shafts, as well as supporting pinion shafts inserted from the outside of the housing, if desired. In addition, there is a need in the industry for a housing capable of using slots and holes to provide adequate lubrication to the pinion gears while maintaining the structural integrity of the housing. Moreover, there is a need to provide a housing capable of supporting pinion shafts without the use of locking pins while providing adequate lubrication into the housing.

SUMMARY OF THE INVENTION

The present invention provides a differential housing having both guide slots and radial apertures. The guide slots and the radial apertures may overlap such that pinion shafts may be axially inserted axially through the guide slots and supported within the apertures. The apertures may further provide fluid communication for lubricating fluid, such as oil, through the housing to properly lubricate the various components of the differential housing assembly.

DESCRIPTION OF THE DRAWINGS

FIG. 5 is a cross-sectional view of a typical differential housing having pinion shaft support holes there through.

FIG. 7 is a cross-sectional view of a differential housing according to an embodiment of the invention.

FIG. 8 illustrates an embodiment of a differential housing having a pinion shaft insertable therethrough.

DETAILED DESCRIPTION OF THE INVENTION

Figure 2:
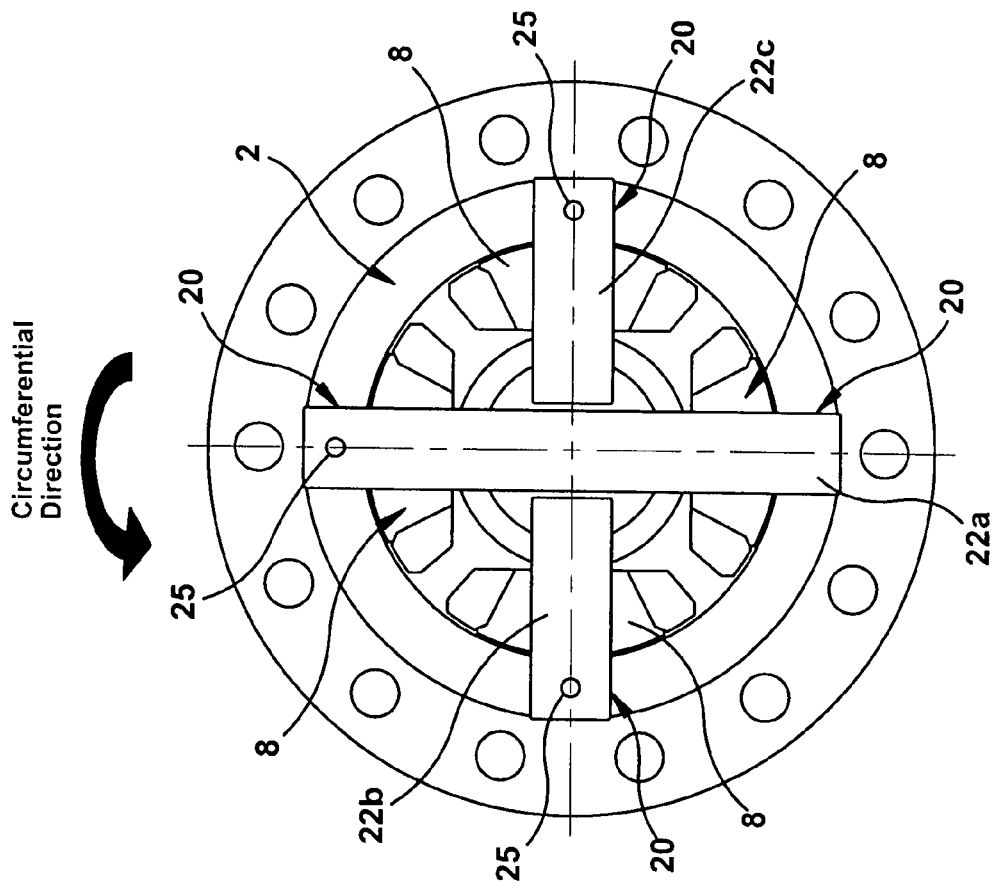
FIG. 2 is a cross-sectional view of the differential of FIG. 1 taken generally along line A-A.
Figure 1:
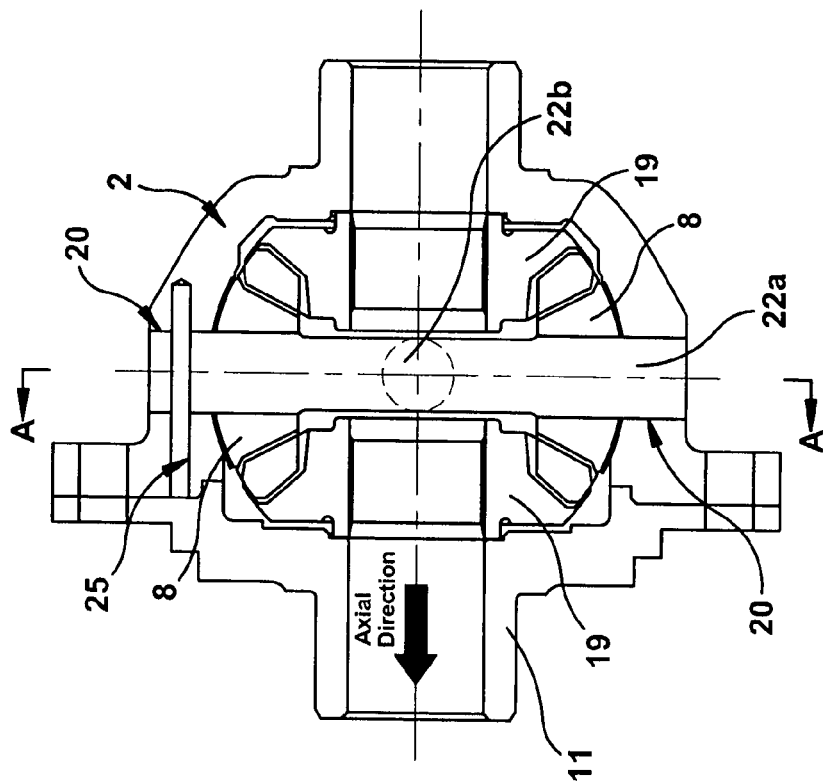
FIG. 1 is a cross-sectional view of a typical differential with pinion shaft support holes therethrough.
Figure 4:
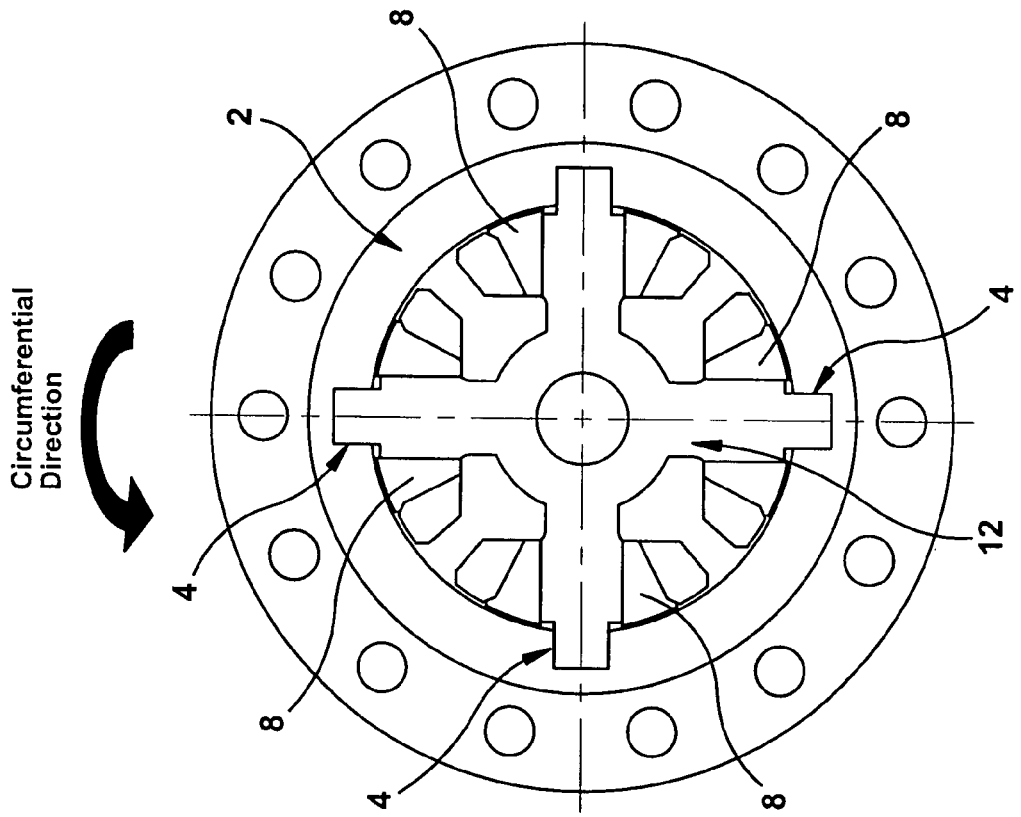
FIG. 4 is a cross-sectional view of the differential of FIG. 3 taken generally along line A-A.
Figure 3:
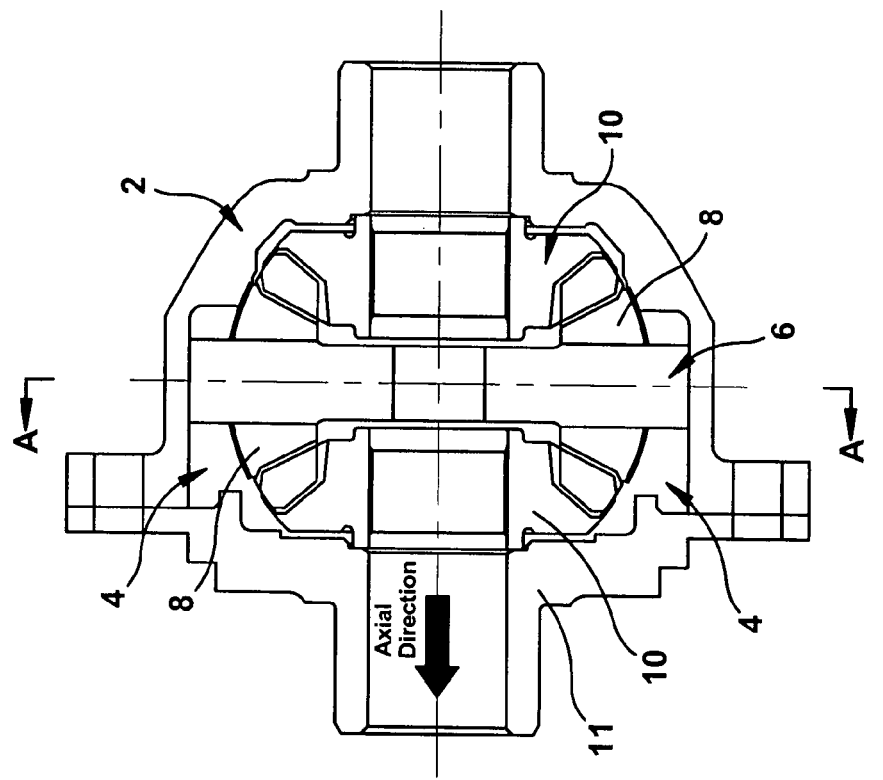
FIG. 3 is a cross-sectional view of a typical differential with pinion shaft support slots therein.
Figure 6:
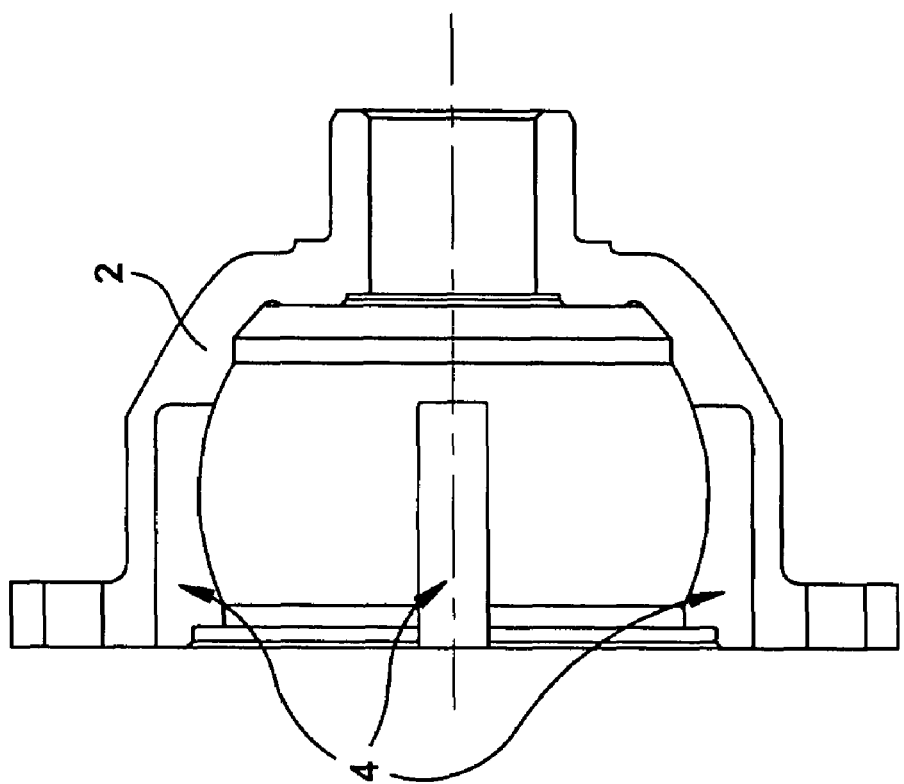
FIG. 6 is a cross-sectional view of a typical differential housing with pinion shaft support slots therein.
Figure 5:
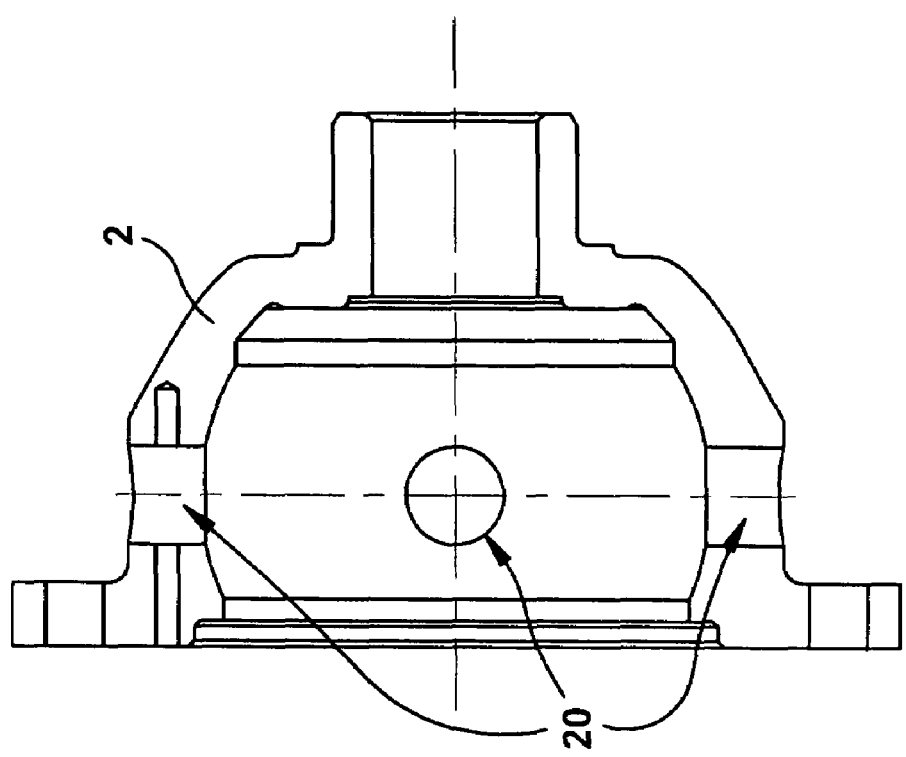

A typical differential with the hole-type design is shown in FIGS. 1, 2, and 5. A typical differential with a slot-type design is shown in FIGS. 3, 4, and 6. An embodiment of the invention disclosed herein is shown in FIG. 7.

As shown in FIG. 7, a differential housing 52 that has an inner wall 54 and an outer wall 56 defining an interior 58 of the differential housing 52. The interior 58 is capable of housing side gears, pinion gears and pinion shafts as illustrated in FIGS. 1-6. An opening 90 is located axially at one end of the housing 52 which provides access to the interior during assembly. A cover is securable to the housing 52 after assembly to close the opening 90, such as the cover 11 as illustrated in FIG. 1.

The differential housing 52 has apertures 60 and guide slots 70 therein. The combination of the apertures 60 and the guide slots 70 is generally more advantageous for differential assemblies having more than two pinion gears, multiple pinion shafts and/or a spider pinion shaft. However, one of ordinary skill in the art will appreciate that the invention may be used with any number of pinion gears and/or pinion shafts.

As shown in FIG. 7, the guide slots 70 may be located along the inner wall 54 of the differential housing 52. For example, the guide slots 70 may extend axially or longitudinally from the opening 90 along the inner wall 54 of the housing 52 toward the interior 58 a predetermined distance from the opening 90. The guide slots 70 allow the sliding of pinion shafts into the housing 52 during assembly. Advantageously, the guide slots 70 provide for axial insertion of pinion shafts 91 having pinion gears 92 previously mounted thereon, as illustrated in FIG. 8.

Termination of the guide slots 70 may occur in the interior 58 at a predetermined distance from the opening 90. At the predetermined distance, the pinion shafts 91 may be properly positioned within the differential housing 52. In an embodiment, the housing 52 may have four guide slots 70 for the insertion of one or more pinion shafts 91. For example, the spider pinion shaft assembly 12 of FIG. 4 may be axially inserted into the housing 52 via the guide slots 70. The guide slots 70 may align such that two confronting guide slots 70 allow axial insertion of the vertical portion of the pinion shaft 91 within the housing 52 while two additional radially offset guide slots 70 allow axial insertion of the horizontal portion of the pinion shaft 91. Nevertheless, the present invention should not be deemed as limited to any specific number of pinion shafts 91, guide slots 70, and/or any specific number of apertures 60.

To assist in the axial loading and support of the pinion shafts 91, the height H of the guide slots 70 may decrease toward the interior 58 of the housing 52. The width W of the guide slots 70 may also decrease toward the interior 58 of the housing 52. To this end, insertion of the pinion shafts 91 may be essentially be snap-fitted through the guide slots 70 into their set position to assist in preventing axially movement or disengagement of the pinion shaft 91 from their set position within the interior 58 of the housing 52.

FIG. 7 further shows apertures 60 extending axially through the housing 52. The apertures 60 extend through the outer wall 56 and the inner wall 54 to provide fluid communication between the exterior of the housing 52 and interior of the housing 52. Fluid, such as oil, may lubricate the pinion shafts 91, pinion gears 92, side gears and/or the other components through the apertures 60 to prevent friction and debris buildup.

The apertures 60 may extend through the differential housing 52 so that the apertures 60 and the guide slots 70 are in communication with each other. In an embodiment, each of the guide slots 70 may have a corresponding aperture 60. The apertures 60 may be positioned at the terminal end of the guide slots 70 and sized and shaped to support the pinion shafts therein. For example, the guide slots 70 may connect the opening 90 of the differential housing 52 with the apertures 60 so that a spider-type pinion shaft may be assembled through the guide slots 70 and into the apertures 60.

The apertures 60 may overlap the guide slots 70 at overlap regions 100. As the width W and the height H of the guide slots 70 decrease toward the interior 58 of the housing 52, there may be an increased resistance to the insertion of the pinions shafts 91. Accordingly, the pinion shafts 91 may move through the guide slots 70 and snap into the apertures 60 such that the pinion shafts 91 will not shift significantly from their set position. For example, together the guide slots 70 and the apertures 60 may allow axial insertion of the pinions shafts into the interior 58 of the housing 52 such that the pinion shafts will snap or otherwise securely fit in the apertures 60. Advantageously, the present invention is capable of properly positioning the pinion shafts 91 such that locking pins are not required, as shown in FIG. 2.

As a further advantage, the overlap region 100 allows the present invention to increase the allowable tolerances permitted in the construction of the housing 52, thus reducing costs for manufacturing. For example, the pinion shaft 91 is insertable through the guide slots 70 and supportable within the apertures 60 in a fashion in which the accuracy of circumferential positioning and width of the slots and apertures are easier achieve with a low-cost manufacturing machine than the known slot-type differentials as shown in FIG. 6.

Still another advantage of the present invention is that the apertures 60 allow fluid communication through the housing 52. Known hole-type differentials provide a tight fit of the pinion shafts 91 into the apertures 60 such that fluid communication is very limited. Typically, the pinion shafts 91 of known differentials are pinned to the housing so that fluid communication is very limited because there may be no axial play and/or movement possible by the pinion shaft 91. The present invention, however, allows limited axial movement of the pinion shafts 91 within the apertures 60 as designed to aid in lubrication.

Moreover, in at least one embodiment, the guide slots 70 may be produced inexpensively, for example, by die casting due to the guide slots 70 functioning only to aid in assembly. The apertures 60 may also be produced relatively inexpensively, for example, by use of a drill and milling machine. The size and the location of the apertures 60 can be precisely produce to support a pinion gear assembly, such as, the spider pinion gear assembly.

While the invention has been described with reference to the preferred embodiment, other modifications and design changes can be appreciated upon reading the disclosure along with the accompany drawings while also falling within the scope of the invention as described and claimed. As such, nothing in the present description should be implied to limit the invention from what is claimed below.

Having thus described the invention, we claim:

1. A differential housing comprising:
   a body having an opening at one end;
   a guide slot extending a predetermined distance longitudinally into said body from said opening, said guide slot capable of moving a pinion shaft axially therethrough; and
   at least one aperture in said body capable of providing fluid communication between an exterior of said body and an interior of said body, wherein said at least one aperture is sized to secure the pinion shaft from retracting through the guide slot.

2. The differential housing of claim 1 wherein said aperture is in fluid communication with said guide slot.

3. The differential housing of claim 2 wherein said aperture and said guide slot overlap.

4. The differential housing of claim 3 wherein said guide slot narrows from said opening toward said aperture.

5. The differential housing of claim 4 wherein said aperture is positioned at an end of the guide slot opposite the opening.

6. The differential housing of claim 5 wherein said guide slot and said aperture are positioned such that a pinion shaft is capable of moving axially through said guide slot and into said aperture.

7. The differential housing of claim 5 wherein said aperture is capable of properly positioning a pinion shaft in said aperture without the use of locking pins.

8. The differential housing of claim 7 further comprising:
   a cover securable to said opening, said cover separating said interior of said body from the exterior.

9. A differential housing comprising:
   a body having an interior surface and an exterior surface, said body having an opening at one end;
   a plurality of guide slots extending from said opening longitudinally along said interior surface, each guide slot sized for moving an arm of a pinion shaft axially therethrough; and
   at least one aperture in communication with at least one of said guide slots, said aperture extending through said interior surface and said exterior surface, wherein said at least one aperture prevents the pinion shaft from retracting axially through the guide slots.

10. The differential of claim 9 wherein said aperture provides fluid communication between said exterior surface and said interior surface.

11. The differential housing of claim 9 further comprising:
    a cover securable to said body capable of separating said cavity from said exterior of said body.

12. The differential housing of claim 9 wherein said guide slots are capable of moving a spider pinion shaft axially therethrough.

13. The differential housing of claim 9 wherein at least two of said guide slots are aligned for moving two opposing arms of a pinion shaft axially therethrough.

14. The differential housing of claim 13 wherein said guide slots extend a predetermined distance from said opening and further wherein said guide slots narrow from said opening into said cavity.

15. The differential housing of claim 14 further comprising:
    a plurality of said apertures wherein each of said apertures overlaps one of said guide slots.

16. The differential housing of claim 14 wherein said guide slots and said aperture are positioned such that a pinion shaft is capable of moving axially through said guide slot and into said aperture.

17. The differential housing of claim 16 wherein said aperture is capable of supporting a spider pinion shaft for rotational engagement with the housing without using locking pins to secure the pinion shaft to the housing.

18. A method for assembling a differential housing assembly comprising:
    providing a differential housing having a wall with an interior surface and an exterior surface, said wall defining an interior cavity therein,
    forming a plurality of guide slots extending along said interior surface into said interior cavity,
    forming a plurality of apertures connected to said guide slots; and
    axially moving a spider pinion shaft into said differential housing, said spider pinion shaft having a plurality of arms and pinion gears attached to said arms, wherein each of said arms slides through said slots and into said apertures.

19. The method of claim 18 wherein at least one of the apertures prevents axial movement of said spider pinion shaft through the guide slots.

20. The method of claim 19 wherein the spider pinion shaft snap fits into at least one of the apertures.

* * * * *